United States Patent [19]

Terrill

[11] Patent Number: 4,656,774

[45] Date of Patent: Apr. 14, 1987

[54] SURFACE ENGAGING FISHING POLE HOLDER

[76] Inventor: Maurice W. Terrill, 12454 E. Alaska Ave., Aurora, Colo. 80012

[21] Appl. No.: 808,259

[22] Filed: Dec. 12, 1985

[51] Int. Cl.⁴ ............................................. A01K 97/10
[52] U.S. Cl. ...................................... 43/21.2; 248/545
[58] Field of Search ...................... 43/21.2; 16/110 R; 248/511, 521, 530, 156, 545, 520, 522, 533

[56] References Cited

U.S. PATENT DOCUMENTS

| | | | |
|---|---|---|---|
| 1,800,254 | 4/1931 | Holmes | 16/110 R |
| 2,137,645 | 11/1938 | Doench | 43/21.2 |
| 2,139,826 | 12/1938 | Huntley | 248/156 |
| 2,628,797 | 2/1953 | Campomar | 248/545 |
| 2,751,174 | 6/1956 | Parker | 248/545 |
| 3,341,157 | 9/1967 | Duncan | 43/21.2 |
| 4,091,497 | 5/1978 | Bade | 16/110 |
| 4,454,824 | 6/1984 | Wood | 248/156 |

FOREIGN PATENT DOCUMENTS 2533414  3/1984  France .................. 43/21.2

Primary Examiner—M. Jordan
Attorney, Agent, or Firm—Nicholas J. Aquilino

[57] ABSTRACT

A surface engaging fishing pole holder formed of a surface engaging stake, the lower end of which includes an auger adapted to penetrate ice or the ground, a fishing pole support section forms a crank arm and includes an offset handle and a gripping sleeve whereby the holder may be screwed into ice or the ground surface by rotating the auger portion by means of the handle to secure the same and provide a stable holder for a fishing pole or the like.

1 Claim, 3 Drawing Figures

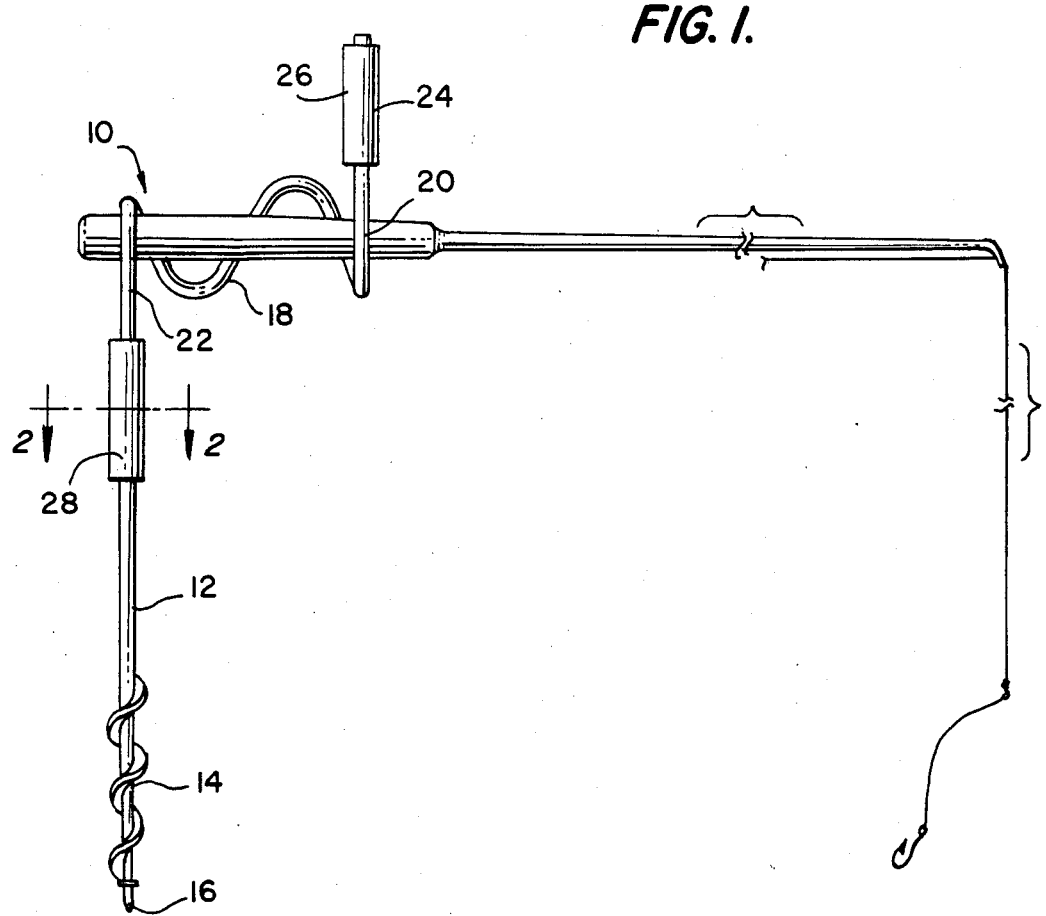
FIG. 1.
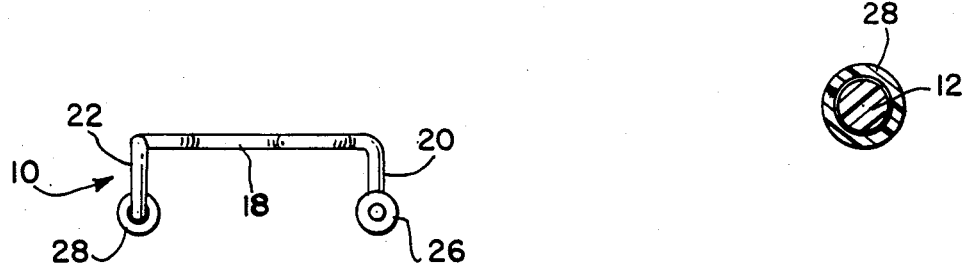
FIG. 3.
FIG. 2.

SURFACE ENGAGING FISHING POLE HOLDER

BACKGROUND OF THE INVENTION

The present invention relates to fishing pole holders, and more particularly to ice or ground engaging holders which are rotatably secured to the supporting surface.

Fishing pole holders are well known and are used to support fishing poles in a raised position thereby eliminating the need for the fisherman to handle the pole at all times. This is particularly useful in ice fishing where attention must be paid to the other equipment and where it is customary to provide shelter and warmth in the fishing hole environment. Known ice fishing pole holders include a spike which is pounded into the ice by means of a heavy tool or the like to provide a stable pole support.

The present invention provides a fishing pole holder which is combined with a surface engaging auger which is rotatably screwed into the ice or ground surface by means of an integral crank handle. The pole holder is secured to the staff forming an extension of the ground engaging auger and is offset thereto at roughly a 90 degree angle so as to form a crank arm for the handle so that the device may be screwed into the support surface. The shaft includes a gripping sleeve which is freely rotatable with respect to the shaft in order that one hand might hold the auger and shaft in place while the other hand cranks the handle to screw the device into the surface.

Among the objects of the present invention are the provision of a fishing pole holder equally adapted to be used for ice fishing or for ground surface fishing; the provision of a pole holder which includes a surface engaging auger and pole holder integrally formed therewith which is inexpensive and may be readily used without additional tools or materials to support a fishing pole.

DESCRIPTION OF THE DRAWINGS

FIG. 1 is a view of the present invention supporting a fishing pole;

FIG. 2 is a sectional view taken through lines 2—2 of FIG. 1; and

FIG. 3 is a top view of the invention of FIG. 1.

DESCRIPTION OF PREFERRED EMBODIMENT

FIG. 1 illustrates the fishing pole holder 10 of the present invention. The holder 10 is formed of an elongated surface engaging stake 12, the lower end of which is formed with an auger 14. The auger 14 is shown with a pointed bit 16 although it will be appreciated that any suitable spiral drill type device could be used with the pole holder.

The upper portion of the stake 12 is connected to a convoluted pole support section 18 formed at a 90 degree angle with the stake 12 which includes an upwardly opening half loop 20 and a downwardly opening half loop 22. The pole support section 18 terminates in an upwardly projecting crank handle 24 formed generally parallel to the stake 12 and at a 90 degree angle to the pole support section. With this structure, the pole support section 18 forms a crank arm between the crank handle 24 and the auger 14. The crank handle 24 may be provided with a loosely rotatable sleeve 26 to facilitate rotating the same. The surface engaging stake also is provided with a second rotatable sleeve 28 to provide a hand grip surface on the stake 12.

When it is desired to insert the fishing pole holder 10 into the supporting surface, whether it is ice, earth, wood or anything else suitable, the pointed bit 16 is placed perpendicular to the supporting surface. Using downward pressure, the crank handle 24 is rotated in the direction of the auger 14 and bit 16 threads which causes a brace and bit action to screw the stake 12 into the supporting surface. The rotatable sleeve 26 on the crank handle 24 and the rotatable sleeve 28 on the stake provide hand grips which do not require regripping as the rotation of the device takes place. Once the surface engaging auger 14 penetrates the supporting surface a suitable depth, the pole support section 18 may be oriented in the proper direction and the pole supported therein. In the embodiment shown, the pole P would be placed in the half loops 20 and 22 in such a manner that the weight of the pole would maintain it in the pole support section until removed at a later time. When the fishing is completed, the crank handle 24 is merely rotated in the reverse direction to remove the pole holder from the ice or other supporting surface.

It will be appreciated that modifications may be made to the present invention. The structure is shown with the parts formed from a single elongated piece of material. However, each section may be a separate part and may be a different shape so long as the structural relationship is maintained. For example, the pole support section could be a tubular device and operate equally well as a crank arm between a crank handle and the ground engaging stake. Other modification may be made in keeping within the scope of the present invention as claimed.

I claim:

1. A fishing pole holder comprising:

a ground surface engaging stake having an upper section and lower section; an auger formed on said lower section of said stake adapted to penetrate said ground surface;

said upper section including a fishing pole support integrally connected to said lower section and offset therefrom at an angle, said fishing pole support being convoluted and having an upwardly extending half loop section and a downwardly extending half loop section adapted to engage and support a fishing pole handle;

said fishing pole holder forming a crank arm for rotating said auger; a gripping sleeve freely rotatable and telescopically mounted on said lower section of said ground engaging stake; and a handle, said handle further including a second gripping sleeve freely rotatable and telescopically connected thereto, said handle being disposed at the end of said fishing pole support and in a parallel relationship with said lower section of said ground engaging stake, said first and second gripping sleeves being substantially parallel with each other, whereby, in use, said handle is rotated with one hand while said ground surface engaging stake is being held with a second hand by means of first said gripping sleeve so rotation of said handle turns said crank arm which in turn rotates said auger causing said ground engaging stake to penetrate said ground surface when rotated.

* * * * *